United States Patent

Lynch et al.

Patent Number: 5,670,229
Date of Patent: Sep. 23, 1997

[54] PAD FOR PROTECTING TREES DURING HARVESTING OPERATIONS

[76] Inventors: Michael Lynch, 2708 Cherry; David J. Dupont, 612 L St., both of Hoquiam, Wash. 98550

[21] Appl. No.: 512,347

[22] Filed: Aug. 7, 1995

[51] Int. Cl.⁶ .................................................. B32B 3/06
[52] U.S. Cl. ........................................ 428/52; 428/99
[58] Field of Search .......................... 428/99, 52, 223, 428/101

[56] References Cited

U.S. PATENT DOCUMENTS

| | | | |
|---|---|---|---|
| 104,418 | 6/1870 | Brunson | 428/491 X |
| 283,837 | 8/1883 | Wallace | 428/101 X |
| 1,446,416 | 2/1923 | Curtiss | 428/101 X |
| 3,321,924 | 5/1967 | Liddell | 428/63 X |
| 3,529,865 | 9/1970 | Atwell | 428/181 X |
| 4,244,156 | 1/1981 | Watts, Jr. | 428/71 X |
| 4,495,233 | 1/1985 | Bassetti | 428/99 X |
| 5,472,768 | 12/1995 | Anson | 428/99 X |

FOREIGN PATENT DOCUMENTS 205217   10/1923   United Kingdom .................. 428/101

Primary Examiner—Henry F. Epstein
Attorney, Agent, or Firm—Miller Nash Wiener Hager & Carlsen LLP

[57] ABSTRACT

This invention is a tree protection pad for protecting the surface of trees to be left standing during a tree thinning operation. The device comprises a sheet of protective, flexible material which is attached to a tree via straps. When the straps are cinched tight, the sheet is pulled against and conforms to the surface of the tree. The protective sheet is easily removable by loosening the straps for subsequent placement on other trees or transportation to other areas.

5 Claims, 4 Drawing Sheets

PAD FOR PROTECTING TREES DURING HARVESTING OPERATIONS

TECHNICAL FIELD

This invention generally relates to tree thinning operations. More particularly, it relates to protective devices used to prevent damage to trees left standing after a tree thinning operation.

BACKGROUND INFORMATION

Land owners may wish to cut and remove certain trees from their property while not disturbing surrounding trees. This operation is called selective harvesting or tree thinning.

Tree thinning has little benefit unless the cut trees can be removed without significantly harming the trees left standing. This can be especially difficult when working with large trees. They are usually cut to length after felling, dragged to a loading area, and then loaded onto a log truck for transport to a mill. Because of their large size, and the type of equipment used to remove them, it is difficult to avoid bumping and abrading the bark of the standing trees during this process. The damage caused to the standing trees can be unsightly at a minimum, but it also can do serious harm to the trees.

One solution for protecting the standing trees involves the use of split plastic tubes or culverts. The culverts are large in size and must be transported to the place where the thinning operation is to occur. Individual culverts are spread apart or opened into the shape of a "C" and then closed around a tree that may need protection. This operation is time consuming and can involve as many as two people because of the bulky size and stiffness of the culverts.

The present invention offers an improved device for protecting trees during a tree thinning operation. The device may be transported and installed easily by a single person, may protect trees of any circumference, and is also well-adapted to protecting trees having very irregular surfaces.

SUMMARY OF THE INVENTION

The invention is a tree protection pad consisting of a sheet of flexible material, such as, for example, a very durable rubber or a material used to make conveyor belts. The outer surface of the sheet is made from a tough substance, such as nylon, that is resistant to abrasive damage. Attached to the sheet is at least one strap, but preferably a number of straps, for holding the sheet at least partially around the trunk of a tree.

Each strap is homogeneously molded into the flexible sheet. Opposite ends of the strap protrude from or adjacent opposite sides of the sheet and extend around the tree trunk. The ends are adjustably cinched together by a strap ratchet mechanism which pulls the sheet snugly against the tree.

The tree protection pad may be transported and put into place by a single person in a very short period of time. During or after a tree thinning operation, the pad is likewise easily removed from one tree and placed on the next, as needed, by a single person in a few minutes. The advantage this provides over and above the culvert system described above will become better understood upon reviewing the following description, which is to be read in conjunction with the accompanying drawings.

BRIEF DESCRIPTION OF DRAWINGS

In the drawings, like reference numbers refer to like parts throughout the various views, unless specifically indicated otherwise, and wherein.

BEST MODE FOR CARRYING OUT THE INVENTION

Figure 2:
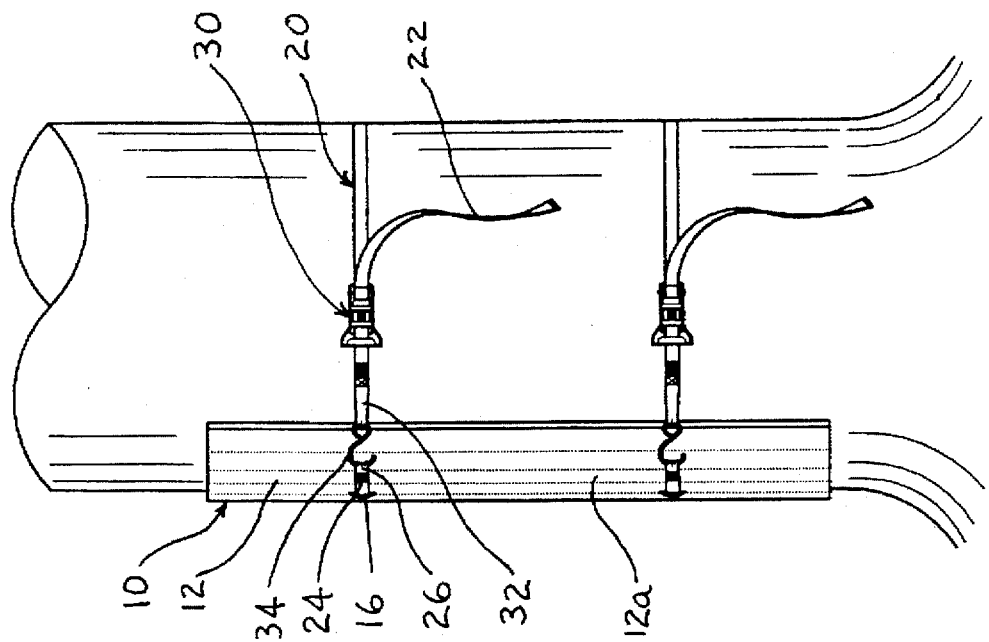
FIG. 2 is a view like FIG. 1, showing the straps used to attach the protective pad to the tree.
Figure 1:
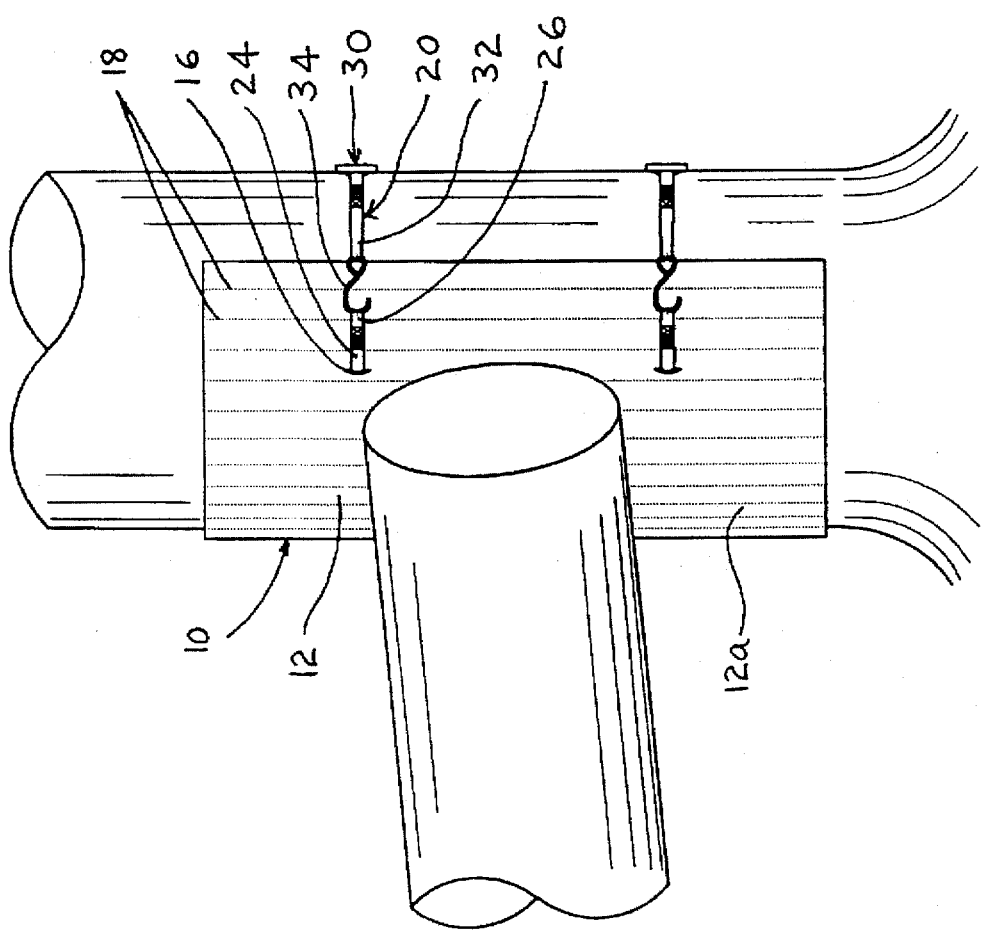
FIG. 1 is a pictorial view showing a tree to be left standing, having installed upon it a protective pad constructed in accordance with the invention.

Referring now to the drawings, and first to FIGS. 1 and 2, indicated generally at 10, is a protective pad constructed in accordance with a preferred embodiment of the invention. The pad 10 is made of a flexible sheet 12 and includes a pair of strap assemblies, indicated generally at 20.

Figure 3:
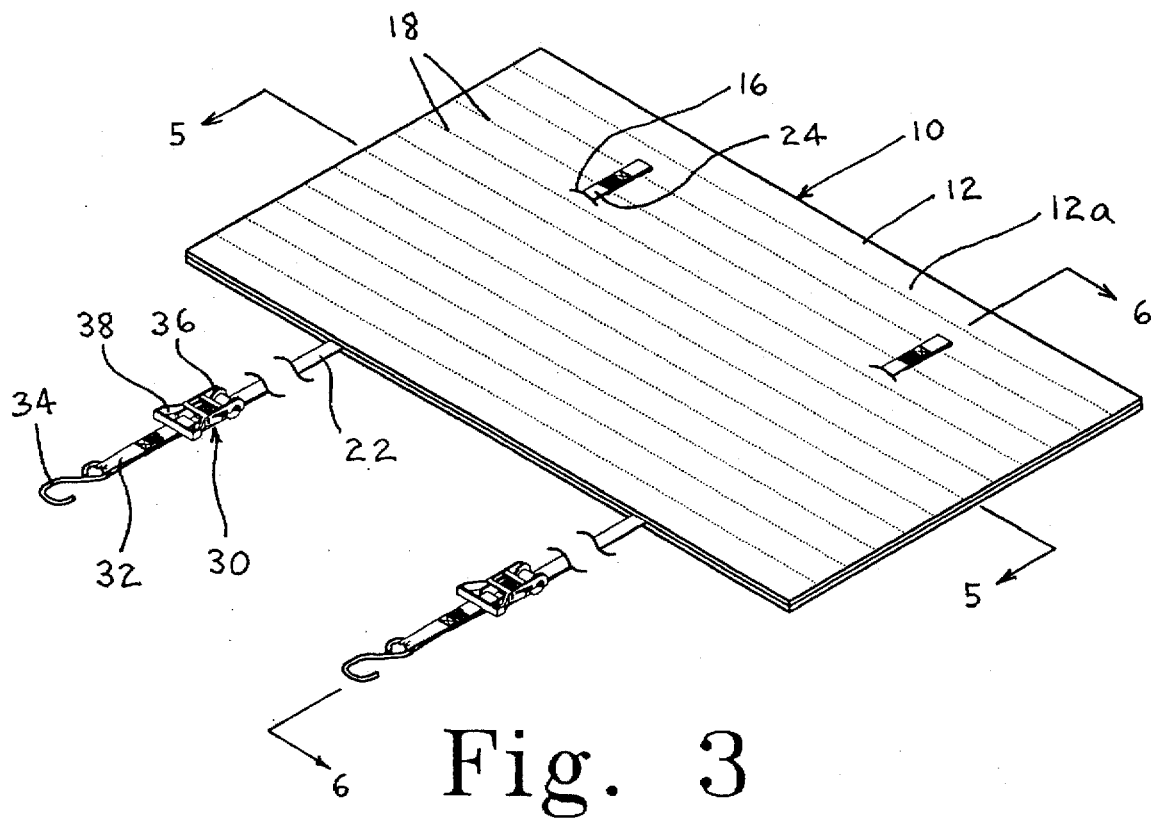
FIG. 3 is a pictorial view showing the protective pad removed from the tree.
Figure 4:
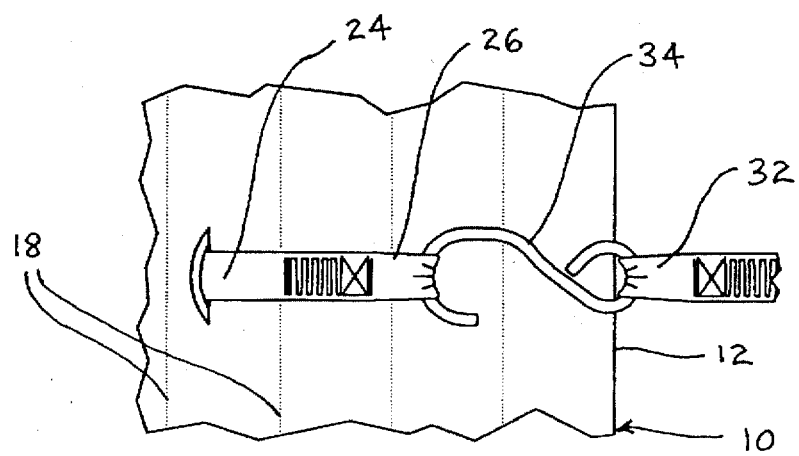
FIG. 4 is an enlarged pictorial view of the strap ratchet mechanism used to connect the protective pad to the tree.

Each strap assembly 20 has a strap 22 which protrudes from a first edge or side 13 of the sheet 12 (see FIG. 3). Each assembly 20 also has a strap ratchet, indicated generally at 30, which is slidably connected to the strap 22. Connected to the strap ratchet 30 is another section of strap 32 which has a hook 34. The strap assembly 20 extends around the trunk of a tree 36. The hook 34 is engaged with a loop 26, formed in the other end 24 of the strap 22, which holds the assembly 20 in place around the tree.

Figure 6:
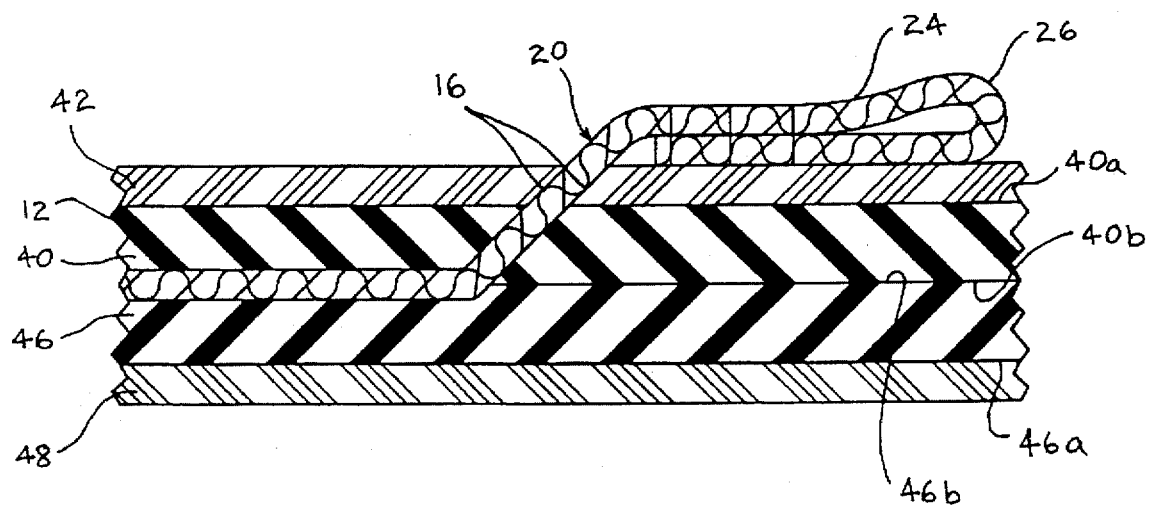
FIG. 6 is a cross-sectional view taken along line B—B of FIG. 3.

Referring to FIGS. 3 and 6, the loop 26 protrudes from the outward face 12a of the sheet 12 a certain distance from the edge of the sheet. The strap ratchet 30, the construction of which would be familiar, has a lever-action arm 38 which can be adjusted along the length of the strap 22 and pulled to cinch the strap assembly 20 tightly around the tree trunk.

Figure 5:
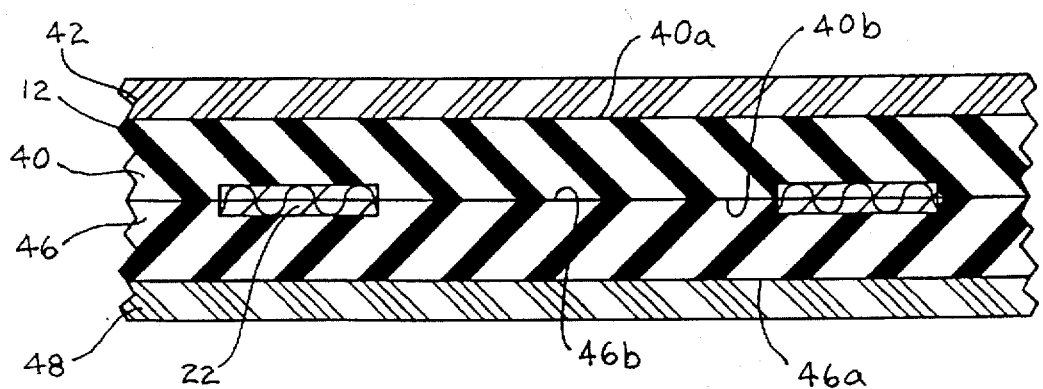
FIG. 5 is a cross-sectional view taken along line A—A of FIG. 3.

The construction and fabrication of the pad 10 is best shown by FIGS. 3, 5, and 6. The sheet 12 is preferably made from outer and inner plies 40, 46 of a durable rubber. These two plies are permanently bonded and vulcanized together. The strap 22 is sandwiched in between during this process, as shown in FIG. 5. The outer ply 40 has an opening 16 (see FIG. 6) slit through its thickness to enable the loop 26 to protrude through to the outer surface 12a of the sheet 12.

Preferably, thin layers of nylon 42, 48 are laminated to the outside of the sheet 12 on both sides. The nylon 42, 48 provides an abrasion-resistant surface. Essentially, the rubber and nylon plies 40, 46, 42, 48 making up both halves of the sheet 12 can be made from the same material as conventional conveyor belting material.

Figure 7:
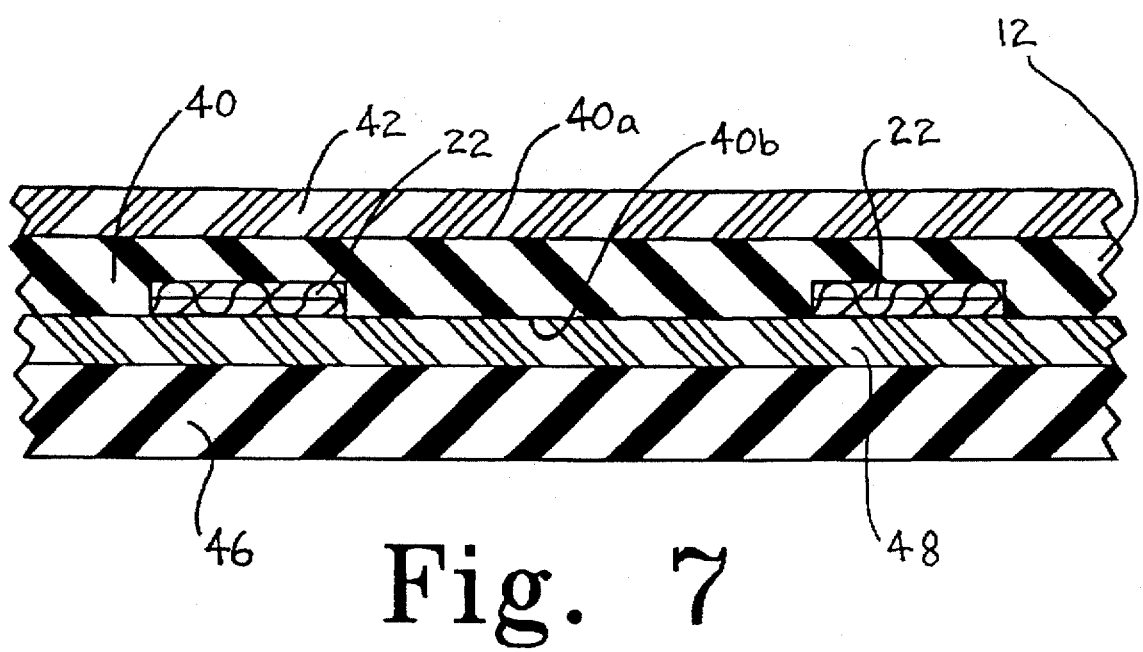
FIG. 7 is a view like FIG. 5 but shows an alternative embodiment of the invention.

Referring to FIG. 7, an alternative embodiment of the invention is shown. Directing attention there, one of the two plies 40, 46 has been reversed so that the abrasion-resistant layer 48 of one is bonded directly to the durable rubber layer 40 of the other.

It has been found that it is possible to bond the two plies together in this fashion while sandwiching the straps 22 in between. The advantage is that the rubber layer 46 may be placed against the tree and is retained better against the tree's surface.

It is conceivable that the FIG. 7 embodiment is the preferred one. As of the filing date of this application, the applicants have been experimenting with its use and believe it may be better than the configuration shown in FIGS. 5 and 6.

The width of the sheet 12 may vary depending on the size of the trees to be protected, but generally should be sized so that it will surround approximately one-half to two-thirds of the circumference of the tree. The height of the sheet may also vary, but typically should be approximately one and one-half to two times the width of the sheet. The thickness of the sheet should be 0.5 to 1 inch thick. It should be appreciated, however, that the above dimensions may vary and are not intended to limit the scope of the invention.

The dimensions of the strap assemblies 20 may also vary. Typically, the width of the strap 22 will be between one and two inches wide. Obviously, the length could vary. Although the drawings show two strap assemblies 30 attached to the sheet 12, it is to be understood that a lesser or greater number could be used.

It is possible to make the sheet 12 more flexible by incorporating perforated grooves 18 (see FIG. 3) in the outer nylon surfaces 42, 48 of the sheet. This is also conventional in conveyor belts.

It is to be understood that the invention as described above could be changed in many ways without departing from what is considered to be the spirit and scope of the invention. Consequently, the above description is not to be taken in a limiting sense. Instead, what is considered to be the invention is defined by the subjoined claim or claims which follow, the interpretation of which is to be made in accordance with the established doctrines of patent claim interpretation.

What is claimed is:

1. A removable pad for protecting the surface of a tree from abrasion during a tree thinning operation, comprising:

a sheet of protective material having sufficient flexibility to allow the sheet to generally conform to at least one side of any one of a plurality of tree trunks having variable circumferences and irregular surfaces, the sheet of protective material being sized such that, when in use, the sheet only partially covers the tree trunk; and at least one strap assembly connected to the sheet, for releasably cinching the sheet to any one of the tree trunks.

2. The pad of claim 1, wherein the sheet includes an inner ply and an outer ply of protective material, the two plies being vulcanized together.

3. The pad of claim 2, wherein a portion of the strap assembly is sandwiched between the inner and outer plies, to connect the strap assembly to the sheet.

4. The pad of claim 2, wherein each ply of protective material comprises a layer of rubber and a layer of nylon, and wherein the layer of nylon makes up an exterior protective facing of the pad.

5. The pad of claim 2, wherein the strap assembly includes a first end of a first strap protruding from a side edge of the pad between the first and second plies of protective material, with the other end of the first strap protruding through a face of the pad and defining a loop, and a strap ratchet in releasable engagement with the first end of the first strap, and a second strap having a first end connected to the strap ratchet and a second end to which a hook is attached, the hook being shaped for engagement with the loop of the first strap.

* * * * *